United States Patent [19]

Weber

[11] Patent Number: 4,607,695
[45] Date of Patent: Aug. 26, 1986

[54] HIGH SWEEP EFFICIENCY STEAM DRIVE OIL RECOVERY METHOD

[75] Inventor: Stevan L. Weber, Allen, Tex.
[73] Assignee: Mobil Oil Corporation, New York, N.Y.
[21] Appl. No.: 580,926
[22] Filed: Feb. 16, 1984
[51] Int. Cl.[4] ............................................. E21B 43/24
[52] U.S. Cl. ....................................... 166/272; 166/309
[58] Field of Search .................... 166/272, 303, 309; 252/8.55 D

[56] References Cited

U.S. PATENT DOCUMENTS

| | | | |
|---|---|---|---|
| 4,086,964 | 5/1978 | Dilgren et al. | 166/252 X |
| 4,393,937 | 7/1983 | Dilgren et al. | 252/8.55 D X |
| 4,444,261 | 4/1984 | Islip | 166/272 |
| 4,488,598 | 12/1984 | Duerksen | 166/272 X |

Primary Examiner—George A. Suchfield
Attorney, Agent, or Firm—Alexander J. McKillop; Michael G. Gilman; Charles J. Speciale

[57] ABSTRACT

In a steam flood oil recovery process wherein the oil-containing formation has a natural brine salinity concentration within the range of 10 to 20% by weight, sweep efficiency is improved by injecting steam until steam breakthrough occurs at the production well after which a mixture of steam, a noncondensible gas, and a surfactant comprising a $C_{12}$ alpha olefin sulfonate is injected into the formation. The $C_{12}$ alpha olefin sulfonate forms a stable foam with the formation oil at formation conditions that reduces the permeability of the highly permeable steam swept zones thereby diverting the steam to other portions of the formation containing unswept oil. If the formation does not contain a natural brine salinity concentration, then the salinity of the mixture of steam, noncondensible and surfactant is controlled to a concentration of about 10% by weight by adding a salt thereto.

15 Claims, 2 Drawing Figures

HIGH SWEEP EFFICIENCY STEAM DRIVE OIL RECOVERY METHOD

FIELD OF THE INVENTION

This invention relates to a thermal oil recovery process such as steam flooding for formations having a natural brine salinity in which the sweep efficiency of the steam is improved significantly by injecting steam and then injecting a mixture of steam, a noncondensible gas, and a surfactant comprising a $C_{12}$ alpha olefin sulfonate to form a stable foam in the steam swept zone in the formation that reduces the permeability of the steam swept zone thereby enabling subsequently injected steam to migrate into additional portions of the formation containing unswept oil.

BACKGROUND OF THE INVENTION

The injection of steam to recover oil from heavy oil formations is an accepted method in the industry. Past experiments and field performance have shown the improved displacement efficiency of heavy oils by reduction in viscosity of the oil by a heated displacing phase. Displacement of oil increases with increasing temperature.

Steam is considerably lighter than the oil and water present in the formation and thus, because of gravity segregation, it tends to rise to the top of the formation when vertical communication exists. Consequently, the injected steam channels through the top of the formation to the producing well overriding a major portion of the formation and contacting only a small fraction of the formation oil. Once steam override has begun, continued injection of steam into the formation will accomplish very little additional oil recovery. This behavior results in an inefficient oil recovery and low vertical sweep efficiency.

U.S. Pat. No. 4,175,618 discloses a high vertical and horizontal conformance thermal oil recovery process wherein steam is injected into a formation until channeling has begun, steam injection is terminated and an aqueous fluid is injected into the formation, which has a viscosity essentially the same as water and contains a surfactant capable of forming a viscous emulsion in the portion's of the formation when override, underride or channeling has occured. After a small slug of emulsifying fluid has been injected, steam injection is resumed and as a consequence of the emulsion plug, moves into portions of the formation from which oil would not be recovered if the emulsion had not been injected. Suitable surfactants include organic sulfonates such as petroleum sulfonate, and solubilizing co-surfactants such as alkyl or alkylarylpolyethoxyalkylene sulfonates. Multiple cycles of steam and emulsion injection may be applied to a formation to more completely sweep the full volume of the pattern.

The following U.S. patents describe processes for forming viscous emulsions on the surface of the earth and injecting them into formations for the purpose of decreasing the permeability of zones in the formations which are more permeable than other portions of the formation. U.S. Pat. Nos. 3,149,669; Re. 27,198 (original U.S. Pat. No. 3,443,636); U.S. Pat. Nos. 3,502,146 (1970); and 3,866,680 (1975). U.S. Pat Nos. 3,946,812; 3,888,308; 3,508,612; 3,500,923; 3,827,497; 3,811,504 and 3,890,239 relate to the use of sulfated ethoxylated surfactants in oil displacing fluids. U.S. Pat. Nos. 3,792,731; 3,799,264; 3,811,504 and 3,811,505 describe oil recovery processes and fluids employing non-ionic surfactants. U.S. Pat. Nos. 3,827,497 and 3,890,239 disclose the use of a mixture of organic sulfonate and a sulfated or sulfonated, ethoxylated alcohol.

Viscous polymer fluids are not effective for treating steam-swept zones in connection with thermal oil recovery methods because such polymers are not stable at the temperatures which are encountered in the steam-swept zone. The viscosity developed by polymers in fluids prepared on the surface of the earth is lost quickly in the subterranean formation after it had been exposed to the elevated temperatures of the steam swept zone. Viscous emulsions are usually unsuccessful in treating permeability problems created in viscous oil formations by steam flooding because the emulsions are difficult to inject into the formation since their viscosity is highest at the time of injection, and so the effectiveness is mostly limited to the portions of the formation very near the wellbore.

Copending application Ser. No. 430,181, filed Sept. 30, 1982, now U.S. Pat. No. 4,444,261 by P. N. Islip relates to a steam drive oil recovery process wherein the vertical and horizontal conformance is improved by alternately injecting steam and a heated thermally stable, diverting fluid comprising a high molecular weight hydrocarbon into the steam-swept zone, allowing the diverting fluid to cool sufficiently to increase its viscosity above that of the in place oil thereby effectively blocking the steam-swept zone.

The present invention provides a method for increasing the sweep efficiency of a steam driven oil recovery method in a viscous oil-containing formation having a natural brine salinity concentration within the range of 10 to 20% by weight utilizing a surfactant comprising a $C_{12}$ alpha olefin sulfonate surfactant mixed with steam and a noncondensible gas that effects a reduction in permeability of steam-swept channels thereby enabling subsequently injected steam to migrate into additional portions of the formation containing unswept oil.

SUMMARY

The present invention relates to a method for recovering oil from a subterranean, viscous oil-containing formation having a natural brine salinity concentration within the range of 10 to 20% by weight and penetrated by at least one injection well and at least one spaced-apart production well, said wells being in fluid communication with a substantial portion of the formation, comprising injecting steam into the formation and producing fluids including oil from the formation via the production well for a predetermined period of time, preferably until steam breakthrough, thereby forming a steam-swept zone in the formation, thereafter injecting a mixture of steam, a noncondensible gas, and a surfactant comprising a $C_{12}$ alpha olefin sulfonate into the formation via the injection well, said surfactant capable of forming a stable foam with residual oil in the steam-swept zone at formation conditions of temperature and natural salinity thereby significantly decreasing the permeability of that zone and diverting the steam into other portions of the formation and continuing to inject said mixture of steam and surfactant and recovering fluids including oil from the formation via the production well. In another embodiment of the invention, if the formation does not have natural salinity, then the salinity of the steam/surfactant mixture is controlled to a concentration of about 10% by weight by adding salt thereto.

DESCRIPTION OF THE PREFERRED EMBODIMENTS

The process of my invention concerns an improvement in a steam flooding type of thermal oil recovery method in a subterranean, viscous oil-containing formation having a natural brine salinity concentration within the range of 10 to 20% by weight, and more particularly involves a method of injecting a mixture of steam, a noncondensible gas, and a surfactant comprising a $C_{12}$ alpha olefin sulfonate that forms a stable foam in the steam-swept channels of the formation at formation conditions of temperature and salinity thereby plugging the previously steam-swept channels so that the injected steam will be forced to pass through unswept oil sections of the formation.

Figure 1:
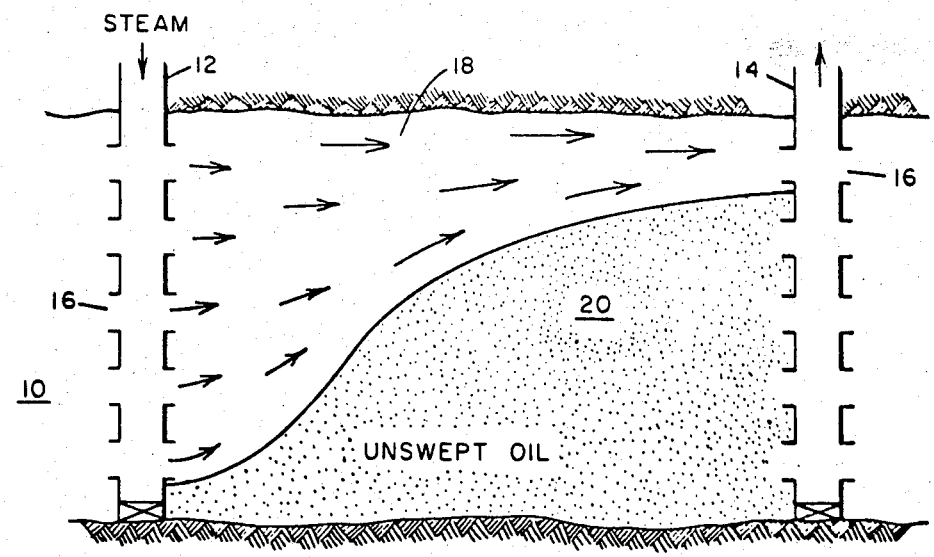
FIG. 1 illustrates a vertical plan view of a subterranean, oil-containing formation having a natural brine salinity concentration and penetrated by an injection well and a production well completed subsequently throughout the formation, illustrating how initial injection of steam migrates to the upper portions of the formation, thus overriding and bypassing a significant amount of oil in the lower portion of the formation.

The process of my invention is best understood by referring to the attached figures, in which FIG. 1 illustrates how a viscous oil-containing formation 10 having a natural brine salinity concentration within the range of 10 to 20% by weight, is penetrated by an injection well 12 and a production well 14. Initially, steam is injected into injection well 12, passes through perforations 16, and then into the formation 10. Conventional practice is to perforate or establish fluid flow communications between the well and the formation throughout the full vertical thickness of the formation, both with respect to injection well 12 and production well 14. The injected steam heats the oil reducing its viscosity and displaces the mobilized oil through the formation 10 toward production well 14 from which it is recovered. Although steam is injected in the full vertical thickness of the formation, it can be seen that steam migrates both horizontally and in an upward direction as it moves through the formation between injection well 12 and production well 14. Once a portion of the formation 18 has been swept by steam passing horizontally through the formation to at least one of the perforations 16 of producing well 14, the problem of premature steam breakthrough is recognized. Since various petroleum has been removed from the portions of the pore spaces of swept zone 18, the permeability to steam is much greater in zone 18 than it is in the lower undepleted portion 20 of the formation 10. Once the high permeability swept zone 18 has been established connecting injection well 12 and production well 14, further injection of steam into the formation will result in steam passing only through zone 18 and consequently displacing very little additional viscous oil from that portion 20 of the formation through which very little of the steam passes causing the overall recovery efficiency from the extra recovery zone to be very low. Referring to FIG. 1, the portion 18 of the formation 10 swept by steam vapor in the first step represents an ever decreasing portion of the vertical thickness of the formation as the steam travels between the injection well 12 and production well 14.

Figure 2:
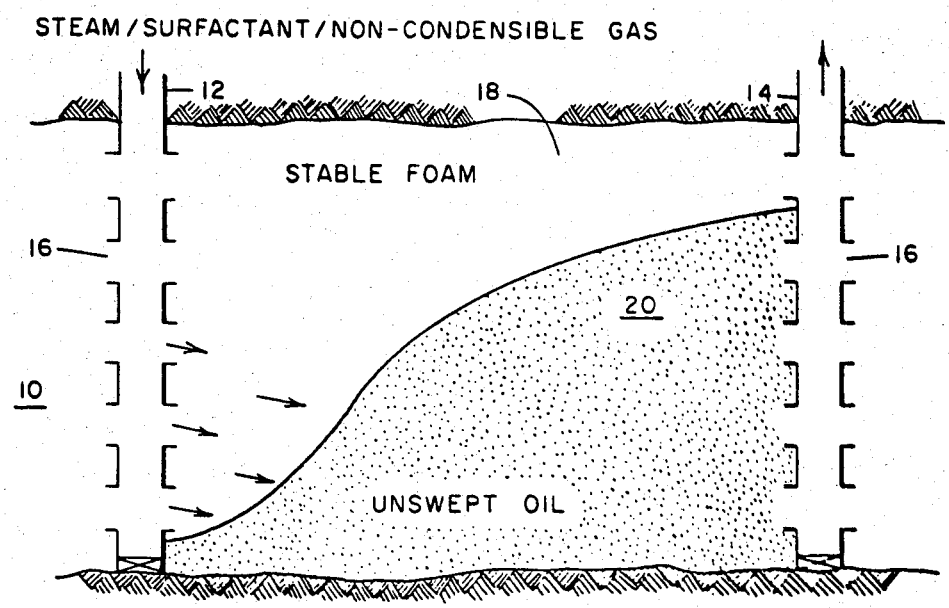
FIG. 2 illustrates the second step of my process wherein a mixture of steam and a surfactant comprising a $C_{12}$ alpha olefin sulfonate is injected into the steam-swept zone that forms a stable foam with the formation oil under formation conditions of temperature and salinity thereby decreasing the permeability of that zone and causing the injected steam to migrate into the lower portion of the formation containing unswept oil.

The second step in the process of my invention is initiated once steam breakthrough occurs in production well 14 after which a mixture of steam, a noncondensible gas, and a surfactant comprising a $C_{12}$ alpha olefin sulfonate is injected into the formation via injection well 12 and fluids including oil are continued to be recovered from the formation 10 via production well 14 as illustrated in FIG. 2. The noncondensible gas may include nitrogen, $CO_2$ or flue gas. The volume ratio of noncondensible gas to steam is within the range of 5:1 to 10:1. The $C_{12}$ alpha olefin sulfonate surfactant used in this invention is a water-soluble anionic surfactant and can be prepared by any conventional manner wherein an alpha olefin containing 12 carbon atoms is sulfonated. The preferred $C_{12}$ alpha olefin sulfonate surfactant is Ethyl$_{12}$, a product sold by Ethyl Corporation. The surfactant is mixed with the steam and noncondensible gas in the form of an aqueous solution containing 0.5 to 2.0 weight percent of active ingredient. The weight ratio of steam to aqueous surfactant solution is about 1:1.

Referring to FIG. 2, the injected mixture of steam, noncondensible gas, and surfactant passes into the steam swept zone 18 and as the surfactant is displaced through the steam swept zone 18 it creates a stable foam in that portion of the formation that significantly decreases the permeability of that zone. Continued injection of the mixture of steam, noncondensible gas, and surfactant results in additional formation of the stable foam that selectively decreases the permeability of the high permeability steam swept zone thereby causing steam to pass into zone 20 in the lower portion of the formation below zone 18 containing unswept oil which increases the vertical thickness of the formation swept by steam. Injection of the steam-gas-surfactant mixture and production of oil is continued until steam breakthrough occurs at the production well 14 or until the water cut of the fluid being produced reaches an unfavorable value, preferably at least 95 percent.

In another embodiment of the process of my invention, if the formation 10 does not have a natural brine salinity, then the salinity of the mixture of steam, noncondensible gas, and surfactant is controlled to a concentration of about 10 weight percent by adding sodium chloride since this salt is inexpensive and normally will be readily available. However, salinity control can be accomplished by other salts such as potassium chloride or calcium chloride. Thus by the term "salinity" as used herein and in the appended claims is meant the dissolved salt content of the mixture of steam and surfactant expressed in weight percent.

In accordance with the invention, the temperature of the injected steam is maintained in excess of 500° F., and preferably at temperatures in the range of 500°-600° F. The quality of the steam is within the range of 40 to 60%.

By the term "pore volume" as used herein, is meant that the volume of the portion of the formation underlying the well pattern employed as described in greater detail in U.S. Pat. No. 3,927,716 to Burdyn et al, the disclosure of which is hereby incorporated by reference.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716 to Burdyn et al.

From the foregoing specification one skilled in the art can readily ascertain the essential features of this invention and without departing from the spirit and scope thereof can adapt it to various diverse applications. It is my intention and desire that my invention be limited only by those restrictions or limitations as are contained in the claims appended immediately hereinafter below.

What is claimed is:

1. A method for recovering oil from a subterranean, viscous oil-containing formation having a natural brine salinity concentration within the range of 10 to 20% by weight and penetrated by at least one injection well and at least one spaced-apart production well, said wells being in fluid communication with a substantial portion of the formation, comprising:
    (a) injecting steam into the formation and producing fluids including oil from the formation via the production well for a predetermined period of time, thereby forming a steam-swept zone in the formation;
    (b) thereafter injecting a mixture of steam, a noncondensible gas, and a surfactant consisting of a $C_{12}$ alpha olefin sulfonate into the formation via the injection well, said surfactant capable of forming a stable foam with residual oil in the steam-swept zone at formation conditions of temperature and salinity thereby significantly decreasing the permeability of that zone and diverting the steam, noncondensible gas, into other portions of the formation; and
    (c) continuing to inject said mixture of steam and surfactant and recovering fluids including oil from the formation via the production well.

2. The method of claim 1 wherein step (a) is continued until steam condensate appears at the production well.

3. The method of claim 1 wherein step (a) is continued until vapor phase steam appears at the production well.

4. The method of claim 1 wherein the surfactant is mixed with the steam and noncondensible gas in the form of an aqueous solution containing about 0.5 to about 2.0 weight percent of active ingredient and the weight ratio of steam to aqueous surfactant solution is about 1:1.

5. The method of claim 1 wherein the noncondensible gas is selected from the group consisting of nitrogen, carbon dioxide, and flue gas.

6. The method of claim 1 wherein the volume ratio of noncondensible gas to steam is within the range of 5:1 to 10:1.

7. The method of claim 1 wherein production is continued during step (c) until the fluid being recovered from the formation is at least 95 percent water.

8. A method for recovering oil from a subterranean, viscous oil-containing formation having no natural brine salinity, said formation penetrated by at least one injection well and at least one spaced-apart production well, said wells being in fluid communication with a substantial portion of the formation, comprising:
    (a) injecting steam into the formation and producing fluids including oil from the formation via the production well for a predetermined period of time, thereby forming a steam-swept zone in the formation;
    (b) thereafter injecting a mixture of steam, a noncondensible gas, a salt, and a surfactant consisting of a $C_{12}$ alpha olefin sulfonate into the formation via the injection well, said salt added in an amount sufficient to provide a salinity of about 10 percent by weight based upon the mixture and said surfactant capable of forming a stable foam with residual oil in the steam-swept zone at formation conditions of temperature and salinity thereby significantly decreasing the permeability of that zone and diverting the steam into other portions of the formation; and
    (c) continuing to inject said mixture of steam, noncondensible gas, salt, and surfactant having a salt salinity of about 10 percent by weight into the formation via the injection well and recovering fluids including oil from the formation via the production well.

9. The method of claim 8 wherein step (a) is continued until vapor phase steam appears at the production well.

10. The method of claim 8 wherein the surfactant is mixed with the steam and noncondensible gas in the form of an aqueous solution containing about 0.5 to about 2.0 weight percent of active ingredient and the weight ratio of steam to aqueous surfactant solution is about 1:1.

11. The method of claim 8 wherein the noncondensible gas is selected from the group consisting of nitrogen, carbon dioxide, and flue gas.

12. The method of claim 8 wherein the volume ratio of noncondensible gas to steam is within the range of 5:1 to 10:1.

13. The method of claim 8 wherein production is continued during step (c) until the fluid being recovered from the formation is at least 95 percent water.

14. The method of claim 8 wherein production is continued during step (c) until the fluid being recovered from the formation is at least 95 percent water.

15. The method of claim 8 wherein said salt is selected from the group consisting of sodium chloride, potassium chloride and calcium chloride.

* * * * *